(12) United States Patent
Li et al.

(10) Patent No.: US 11,582,741 B2
(45) Date of Patent: *Feb. 14, 2023

(54) FEEDBACK TIMING AND UPLINK CONTROL INFORMATION RESOURCE MANAGEMENT FOR CARRIER AGGREGATION ACTIVATION

(71) Applicant: QUALCOMM Incorporated, San Diego, CA (US)

(72) Inventors: Chih-Ping Li, San Diego, CA (US); Wanshi Chen, San Diego, CA (US); Heechoon Lee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/328,455

(22) Filed: May 24, 2021

(65) Prior Publication Data

US 2021/0410121 A1 Dec. 30, 2021

Related U.S. Application Data

(63) Continuation of application No. 16/124,116, filed on Sep. 6, 2018, now Pat. No. 11,019,610.

(Continued)

(51) Int. Cl.
*H04W 72/04* (2009.01)
*H04L 5/00* (2006.01)
(Continued)

(52) U.S. Cl.
CPC ............. *H04W 72/042* (2013.01); *H04L 1/12* (2013.01); *H04L 5/001* (2013.01); *H04L 5/006* (2013.01);
(Continued)

(58) Field of Classification Search
CPC ........................... H04W 72/042; H04W 72/04
See application file for complete search history.

(56) References Cited

U.S. PATENT DOCUMENTS

| 11,019,610 B2 | 5/2021 | Li et al. |
| 2014/0092736 A1 | 4/2014 | Baillargeon |

(Continued)

FOREIGN PATENT DOCUMENTS

| CN | 103329458 A | 9/2013 |
| CN | 105323807 A | 2/2016 |

(Continued)

OTHER PUBLICATIONS

Ericsson: "On Bandwidth Parts", 3GPP TSG-RAN WG1 #90, R1-1712953, Prague, Czech Republic, Aug. 21-25, 2017, pp. 1-4. Internet URL: https://www.3gpp.org/ftp/TSG_RAN/WG1_RL1/TSGR1_90/Docs/R1-1712953.zip.

(Continued)

*Primary Examiner* — Sulaiman Nooristany
(74) *Attorney, Agent, or Firm* — Loza & Loza, LLP/Qualcomm

(57) ABSTRACT

Aspects of the present disclose provide various methods and apparatuses for communicating, controlling, and configuring component carrier and bandwidth part (BWP). A scheduling entity receives a capability report from a user equipment (UE). The capability report indicates a capability of the UE to utilize at least one of carrier aggregation (CA) or one or more bandwidth parts. The scheduling entity transmits a command to the UE to reconfigure at least one of a CA configuration or a bandwidth part (BWP) configuration. The scheduling entity determines an anticipated response timing of an acknowledgment (ACK) of the command based on the (Continued)

capability report received from the UE. The scheduling entity receives the ACK according to the anticipated response timing.

24 Claims, 12 Drawing Sheets

Related U.S. Application Data

(60) Provisional application No. 62/557,016, filed on Sep. 11, 2017.

(51) Int. Cl.
*H04W 56/00* (2009.01)
*H04L 1/12* (2006.01)
*H04W 72/0453* (2023.01)

(52) U.S. Cl.
CPC .......... *H04L 5/0053* (2013.01); *H04L 5/0055* (2013.01); *H04W 56/0005* (2013.01); *H04W 72/0453* (2013.01)

(56) References Cited

U.S. PATENT DOCUMENTS

| | | | |
|---|---|---|---|
| 2015/0200752 A1 | 7/2015 | Yin et al. | |
| 2018/0146439 A1 | 5/2018 | Kim et al. | |
| 2018/0220345 A1* | 8/2018 | Moon | H04B 7/088 |
| 2019/0082425 A1 | 3/2019 | Li et al. | |
| 2020/0015275 A1* | 1/2020 | Kim | H04J 11/00 |

FOREIGN PATENT DOCUMENTS

| | | |
|---|---|---|
| CN | 105874844 A | 8/2016 |
| WO | 2012065423 A1 | 5/2012 |
| WO | 2015105057 A1 | 7/2015 |

OTHER PUBLICATIONS

Guangdong Oppo Mobile Telecom: "Bandwidth Part Based Resource Scheduling for Carrier Aggregation," 3GPP Draft, 3GPP TSG RAN WG1 Meeting #90, R1-1713265, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316072, 4 pages, Retrieved from the Internet: URL http://www.3gpp.org/ftp/Meetings_3GPP_SYNC/RAN1/Docs/ [retrieved on Aug. 20, 2017].
HUAWEI., et al., "On NR Carrier Aggregation", 3GPP TSG RAN WG1 Meeting #89,R1-1706903, Hangzhou, China, May 15-19, 2017, 5 Pages, URL: https://www.3gpp.org/ftp/tsg_ran/WG1_RL1/TSGR1_89/Docs/R1-1706903.zip.
NEC: "Remaining Details of the Bandwidth Parts", 3GPP TSG-RAN WG1 Meeting #90, R1-1714052, Prague, Czech Republic, Aug. 21-25, 2017, pp. 1-3. URL: https://www.3gpp.org/ftp/TSG_RAN/WG1_RL1/TSGR1_90/Docs/R1-1714052.zip.
Qualcomm Incorporated: "Further Considerations for Bandwidth Parts", 3GPP TSG-RAN WG1 #90, 3GPP Draft, R1-1713457_Further_Considerations_for_Bandwidth_Parts, 3rd Generation Partnership Project (3GPP), Mobile Competence Centre, 650, Route Des Lucioles, F-06921 Sophia-Antipolis Cedex, France, vol. Ran WG1, No. Prague, Czech Republic, Aug. 21, 2017-Aug. 25, 2017, Aug. 20, 2017, XP051316259, 5 Pages, Retrieved from the Internet: URL: http://www.3gpp.org/ftp/Meetings_3GPP_SYNC/RAN1/Docs/ [retrieved on Aug. 20, 2017] sections 1-3.
Taiwan Search Report—TW107131493—TIPO—dated Mar. 16, 2022.
European Search Report—EP22168539—Search Authority—The Hague—dated Jun. 13, 2022.
AT&T: "Remaining Details of Bandwidth Parts", 3GPP TSG RAN WG1 Meeting #90, R1-1712728 Prague, Czech Republic, Aug. 21-25, 2017, 4 Pages.
LG Electronics: "Correction on CA and BWP Operation for NR", 3GPP TSG RAN WG1 Meeting #94, R1-1808493, Gothenburg, Sweden, Aug. 20-24, 2018, 7 Pages.
Huawei, et al., "Mechanisms of Bandwidth Adaptation", R1-1700011, 3GPP TSG RAN WG1 NR Ad Hoc Meeting, Spokane, USA, Jan. 16-20, 2017, 5 Pages.
International Search Report and Wri I I En Opinion—PCT/US2018/050067—ISA/EPO—dated Nov. 20, 2018.
International Preliminary Report on Patentability—PCT/US2018/050067 The International Bureau of WIPO—Geneva, Switzerland, dated Mar. 26, 2020.
Samsung: "RAN2 Aspect on Fast Carrier Switch", R2-1709576, 3GPP TSG-RAN WG2 #99, Berlin, Germany, Aug. 21-25, 2017, 3 Pages.
Taiwan Search Report—107131493—TIPO—dated Sep. 19, 2022.

\* cited by examiner

FEEDBACK TIMING AND UPLINK CONTROL INFORMATION RESOURCE MANAGEMENT FOR CARRIER AGGREGATION ACTIVATION

PRIORITY CLAIM

This application is a continuation of U.S. patent application Ser. No. 16/124,116 filed Sep. 6, 2018, which claims the benefit of U.S. provisional patent application No. 62/557,016 filed Sep. 11, 2017, each of which is incorporated herein by reference as if fully set forth below in its entirety and for all applicable purposes.

TECHNICAL FIELD

The technology discussed below relates generally to wireless communication systems and to carrier aggregation (CA) and bandwidth part (BWP) configuration and control in wireless communication.

INTRODUCTION

Carrier aggregation (CA) is a technique used in wireless communication to increase the peak user data rates, improve connection reliability, and/or increase overall capacity of a network available to users. CA can combine two or more component carriers that may be contiguous or non-contiguous in frequency. In the next generation networks, one or more bandwidth parts may be defined in a carrier band or component carrier (CC). A bandwidth part (BWP) is a contiguous set of physical resource blocks within the carrier band. A user equipment may be configured to operate in a particular BWP that has a bandwidth narrower than the full bandwidth of the corresponding component carrier. As the demand for mobile broadband access continues to increase, research and development continue to advance wireless communication technologies related to CA and BWP not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication operable at a user equipment (UE). The UE transmits a capability report to a scheduling entity. The capability report indicates a capability of the UE to transmit an acknowledgement (ACK) of a command for reconfiguring at least one of a carrier aggregation (CA) configuration or a bandwidth part (BWP) configuration after a predetermined time delay in response to the command. The UE receives the command from the scheduling entity. The UE transmits the ACK using uplink resources scheduled by the scheduling entity according to an acknowledgment timeline selected based on the predetermined time delay.

Another aspect of the present disclosure provides a user equipment (UE) for wireless communication. The UE includes a communication interface configured to communicate with a scheduling entity, a memory, and a processor operatively coupled with the communication interface and the memory. The processor and the memory are configured to transmit a capability report to the scheduling entity. The capability report indicates a capability of the UE to transmit an acknowledgement (ACK) of a command for reconfiguring at least one of a carrier aggregation (CA) configuration or a bandwidth part configuration after a predetermined time delay in response to the command. The processor and the memory are further configured to receive the command from the scheduling entity. The processor and the memory are further configured to transmit the ACK using uplink resources scheduled by the scheduling entity according to an acknowledgment timeline selected based on the predetermined time delay.

Another aspect of the present disclosure provides a user equipment (UE) for wireless communication. The UE includes means for transmitting a capability report to a scheduling entity. The capability report indicates a capability of the UE to transmit an acknowledgement (ACK) of a command for reconfiguring at least one of a carrier aggregation (CA) configuration or a bandwidth part (BWP) configuration after a predetermined time delay in response to the command. The UE further includes means for receiving the command from the scheduling entity. The UE further includes means for transmitting the ACK using uplink resources scheduled by the scheduling entity according to an acknowledgment timeline selected based on the predetermined time delay.

Another aspect of the present disclosure provides a non-transitory computer-readable medium stored with executable code for wireless communication. The executable code includes instructions for causing a user equipment (UE) to transmit a capability report to a scheduling entity. The capability report indicates a capability of the UE to transmit an acknowledgement (ACK) of a command for reconfiguring at least one of a carrier aggregation (CA) configuration or a bandwidth part (BWP) configuration after a predetermined time delay in response to the command. The executable code further includes instructions for causing the UE to receive the command from the scheduling entity. The executable code further includes instructions for causing the UE to transmit the ACK using uplink resources scheduled by the scheduling entity according to an acknowledgment timeline selected based on the predetermined delay.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
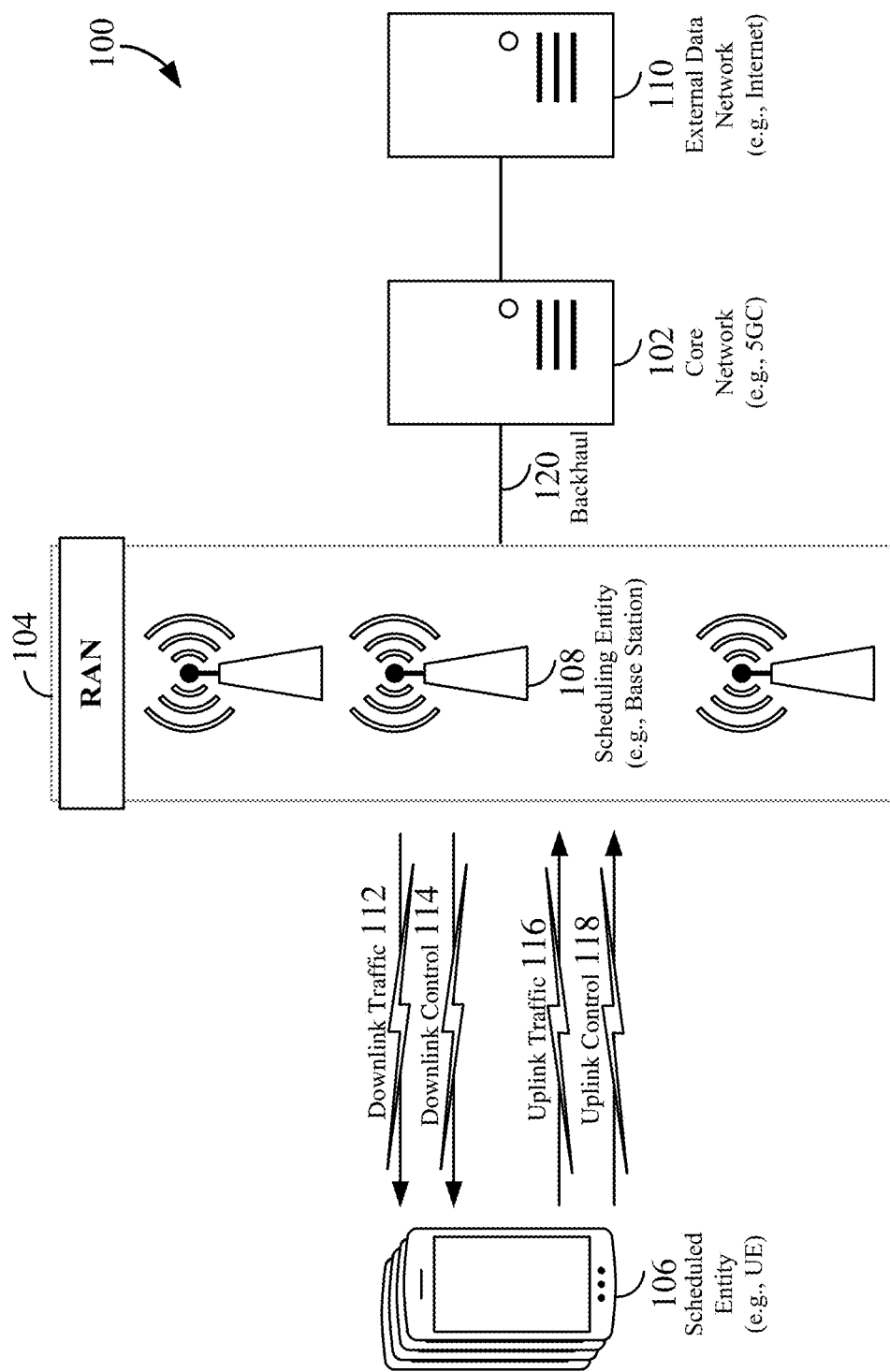
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Carrier aggregation (CA) is a technique widely used in wireless communication to increase bandwidth, reliability, and/or throughput. In next generation networks, for example 5G New Radio (NR), CA can be enhanced to provide more flexibility to handle user equipment (UE) with diverse capabilities. In 5G NR, a bandwidth part (BWP) consists of a group of contiguous physical resource blocks (PRBs), and each BWP may have its own numerology (e.g., cyclic prefix length and subcarrier spacing). One or multiple bandwidth part configurations for each component carrier (CC) may be configured for a UE. If BWP is used, a UE receives and/or transmits within an active or configured BWP on a carrier. In some examples, a total bandwidth of a CC may be divided into multiple BWPs (e.g., one to four BWPs per CC). The BWPs of a CC may have different bandwidths like a narrowband BWP and a wideband BWP. In some examples, the BWPs may overlap in frequency. Any change in the configuration (e.g., activation/deactivation) of component carriers and BWP(s) changes the data throughput available to the UE. Aspects of the present disclose provide various methods and apparatuses for communicating, controlling, and configuring CC and BWP.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduling entities 108 may communicate with the scheduled entities 106 using carrier aggregation and bandwidth parts.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
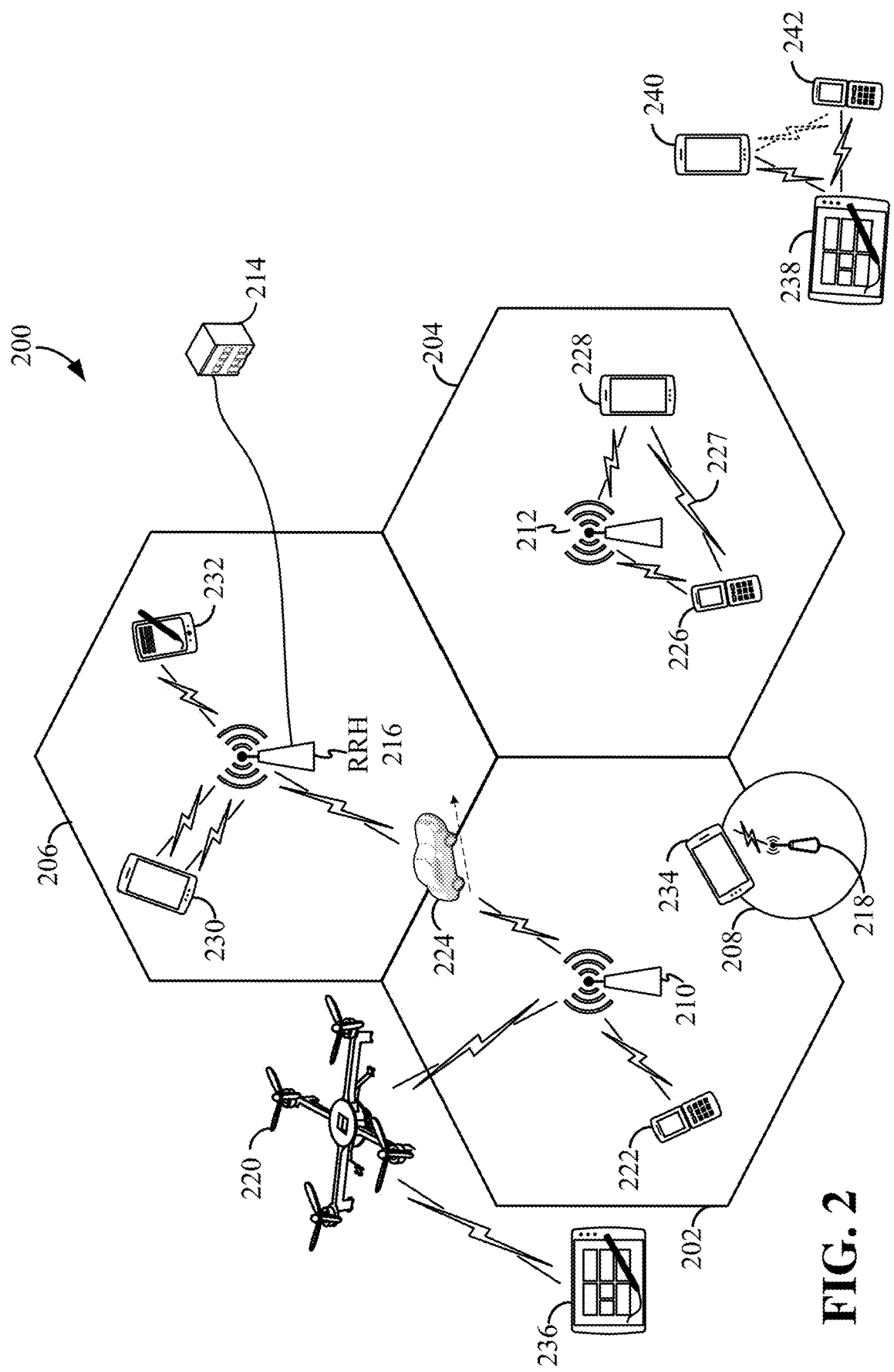
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. A UE 230 may communicate with a base station 216 using one or more component carriers (CCs), and each CC may provide one or more bandwidth parts (BWPs).

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number (e.g., 10) of subframes of, for example, 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. For example, a CC corresponds to a certain number of RBs that may be organized or configured into different BWPs that may or may not overlap in frequency.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
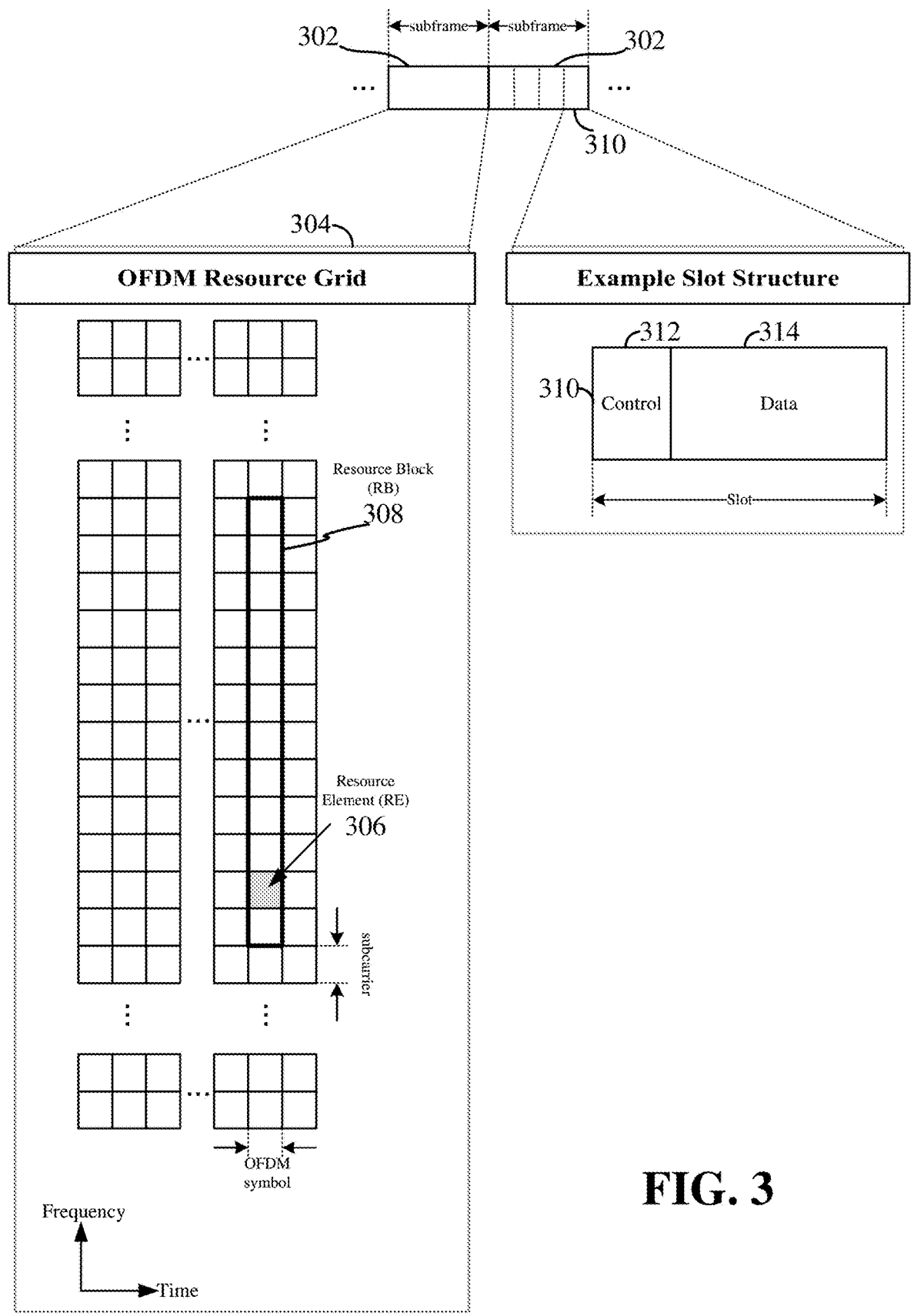
FIG. 3 is a schematic illustration of an organization of wireless resources in an air interface utilizing orthogonal frequency divisional multiplexing (OFDM).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
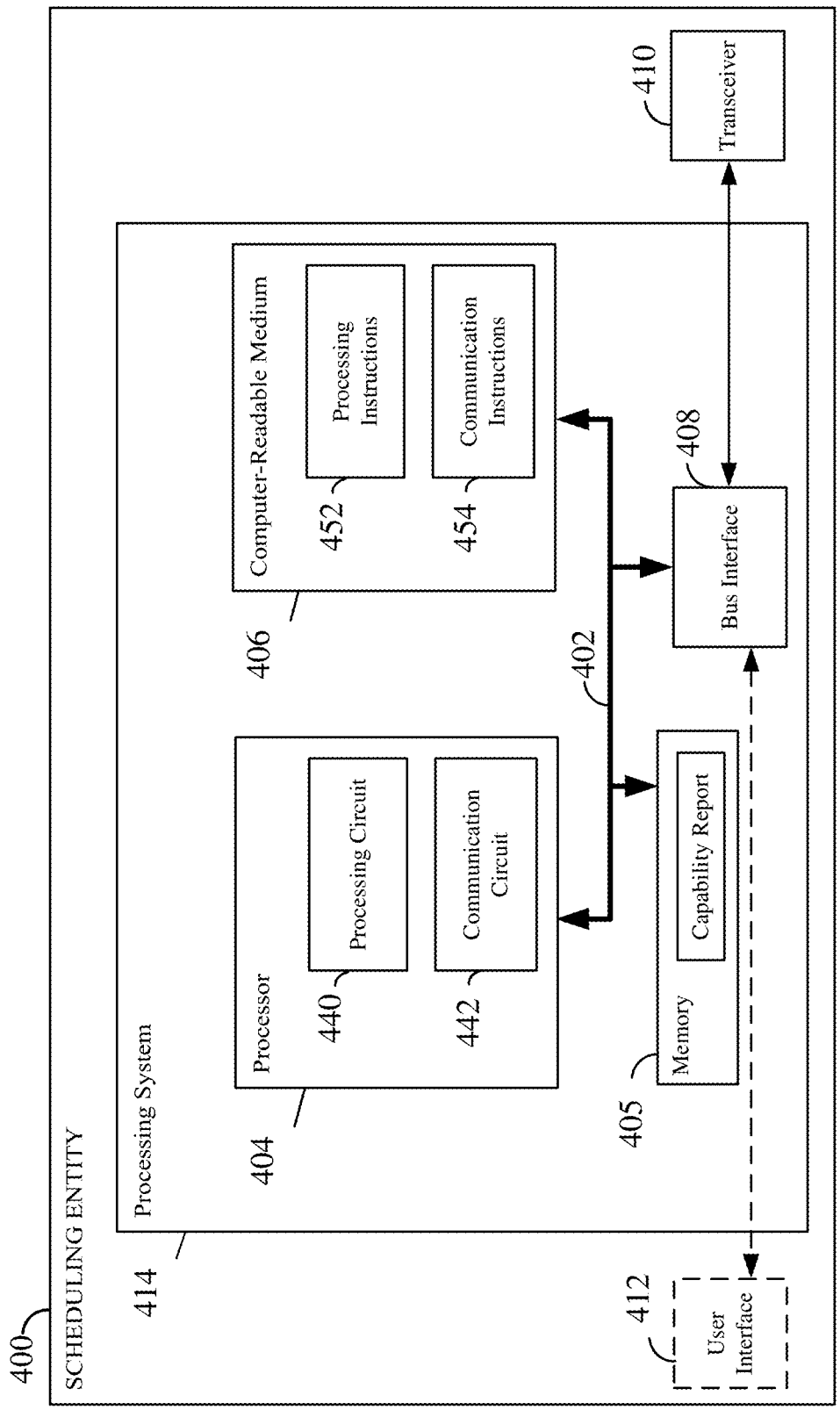
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1, 2, and/or 6. In another example, the scheduling entity 400 may be a base station as illustrated in any one or more of FIGS. 1, 2, and/or 6.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described and illustrated in FIGS. 6-12.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The memory 405 may store a capability report that indicates UE category and various other information, for example, the CA and BWP capability, of the scheduled entity 500 (e.g., UE). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include circuitry configured for various functions, including, for example, a processing circuit 440 and a communication circuit 442. For example, the circuitry may be configured to implement one or more of the functions described below in relation to FIGS. 6-12. The processing circuit 440 may be configured to perform various data processing functions to facilitate communication using the wireless communication circuit 442. The communication circuit 442 may be configured to perform various wireless communication functions including, encoding, decoding, multiplexing, demultiplexing, interleaving, deinterleaving, noise cancellation, channel estimation, channel coding, carrier aggregation, bandwidth part adaptation, etc. In some examples, the scheduling entity may receive a UE capability report that may be stored in the memory 405.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include software configured for various functions, including, for example, processing instructions 452 and communication instructions 454. For example, the software may be configured to implement one or more of the functions described in relation to FIGS. 6-12.

Figure 5:
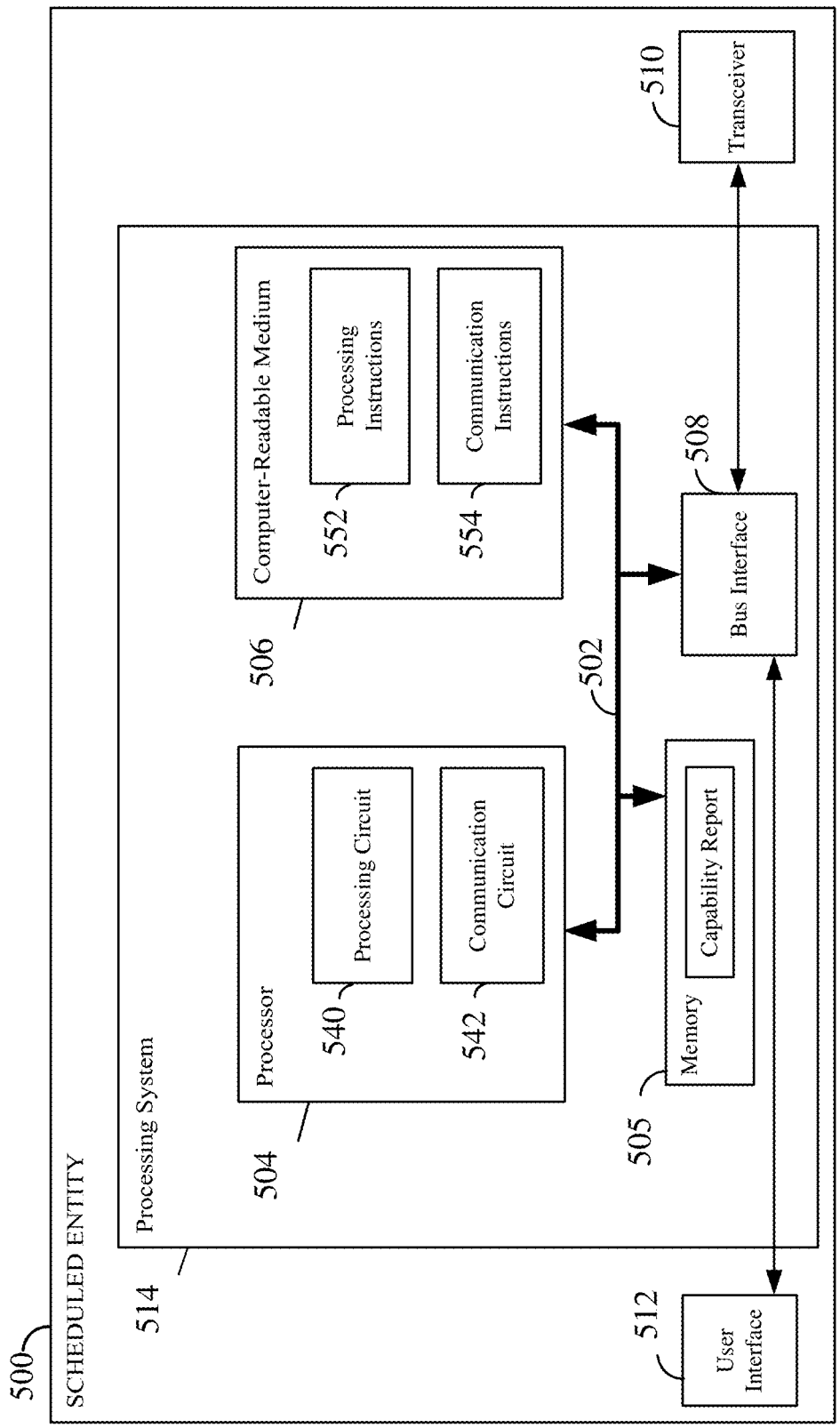
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, and/or 6.

The processing system 514 may be substantially the same as the processing system 414 illustrated in FIG. 4, including a bus interface 508, a bus 502, memory 505, a processor 504, and a computer-readable medium 506. The memory 505 may store a capability report that indicates UE category and various other information, for example, the CA and BWP capability, of the scheduled entity 500. Furthermore, the scheduled entity 500 may include a user interface 512 and a transceiver 510 substantially similar to those described above in FIG. 4. The scheduled entity 50 may transmit the UE capability report to a scheduling entity 400. That is, the processor 504, as utilized in a scheduled entity 500, may be used to implement any one or more of the processes described and illustrated in FIGS. 6-12.

In some aspects of the disclosure, the processor 504 may include circuitry configured for various functions, including, for example, a processing circuit 540 and a communication circuit 542. For example, the circuitry may be configured to implement one or more of the functions described in relation to FIGS. 6-12. The processing instructions 540 may be configured to perform various data processing functions to facilitate communication using the wireless communication circuit 542. The communication circuit 542 may be configured to perform various wireless communication functions including, encoding, decoding, multiplexing, demultiplexing, interleaving, deinterleaving, noise cancellation, channel estimation, channel coding, carrier aggregation, bandwidth part adaptation, etc. In one or more examples, the computer-readable storage medium 506 may include software configured for various functions, including, for example, processing instructions 552 and communication instructions 554. For example, the software may be configured to implement one or more of the functions described in relation to FIGS. 6-12.

Figure 6:
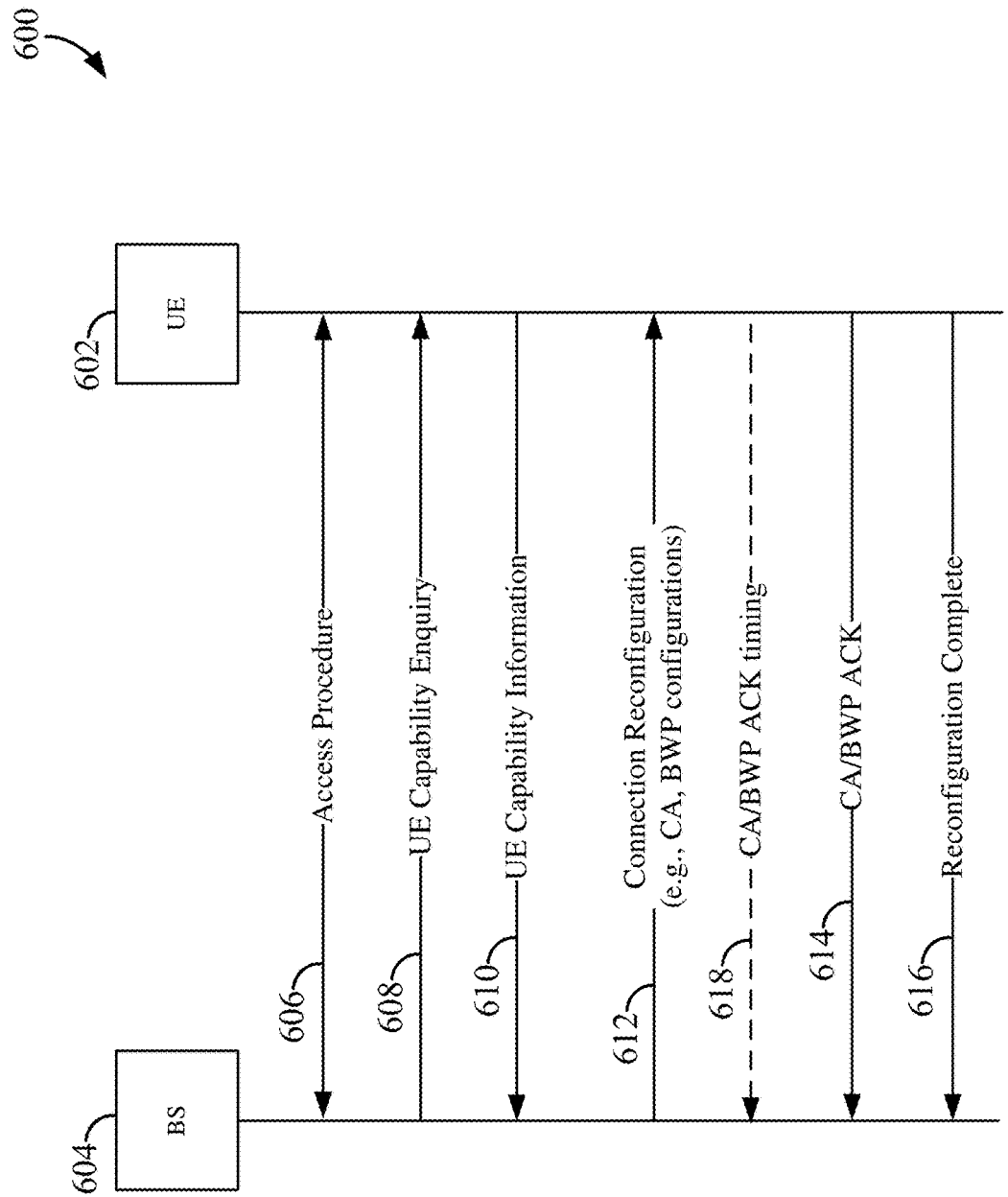
FIG. 6 is a diagram illustrating exemplary carrier aggregation signaling according to some aspects of the disclosure.

FIG. 6 is a diagram illustrating exemplary carrier aggregation signaling 600 according to some aspects of the disclosure. A UE 602 may obtain communication services from a base station (BS) 604 by performing an access procedure 606. One example of the access procedure 606 may be a random access procedure (RACH) or the like. In one aspect of the disclosure, the UE 602 may be any of the UEs illustrated in FIGS. 1, 2, and/or 5, for example, scheduled entity 500 of FIG. 5. In one aspect of the disclosure, the BS 604 may be any of the base stations illustrated in FIGS. 1, 2, and/or 4, for example, scheduling entity 400 of FIG. 4.

After completing the access procedure 606, the UE may receive a UE capability enquiry message 608 from the BS 604. The BS 604 uses the UE capability enquiry message to specify which information it wants to get from the UE. Then, the UE 602 reports its capability information requested by the BS 604. For example, the UE 602 may send UE capability information 610 to report its capability and/or UE category. The UE capability information 610 may include UE category, supported carrier aggregation configuration(s), supported bandwidth part configuration(s), supported RAT (s), etc. In one example, the UE capability information 610 may indicate UE acknowledgment timing in response to carrier aggregation (CA) and bandwidth part (BWP) configuration commands. The BS 604 may send a connection reconfiguration message 612 to the UE 602 to change certain configuration of the connection or communication between the UE 602 and the BS 604. In one example, the connection reconfiguration message 612 may include a CA configuration command and/or a BWP configuration command A CA configuration command may activate or deactivate the use of CA at the UE 602. The CA configuration command may indicate the CC(s) to be activated and/or deactivated. A BWP command may activate, deactivate, or switch BWP(s). In response to the connection reconfiguration message 612, the UE 602 may transmit an acknowledgment message (e.g., CA/BWP ACK 614). For example, the CA/BWP ACK 614 may indicate that the UE received the CA or BWP command After a certain time period, the UE 602 completes the reconfiguration processes to reconfigure (e.g., activate, deactivate, or switch) CA and/or BWP. Then the UE 602 may transmit a reconfiguration complete message 616 to inform the BS 604 that the reconfiguration of CA and/or BWP has been completed.

Figure 7:
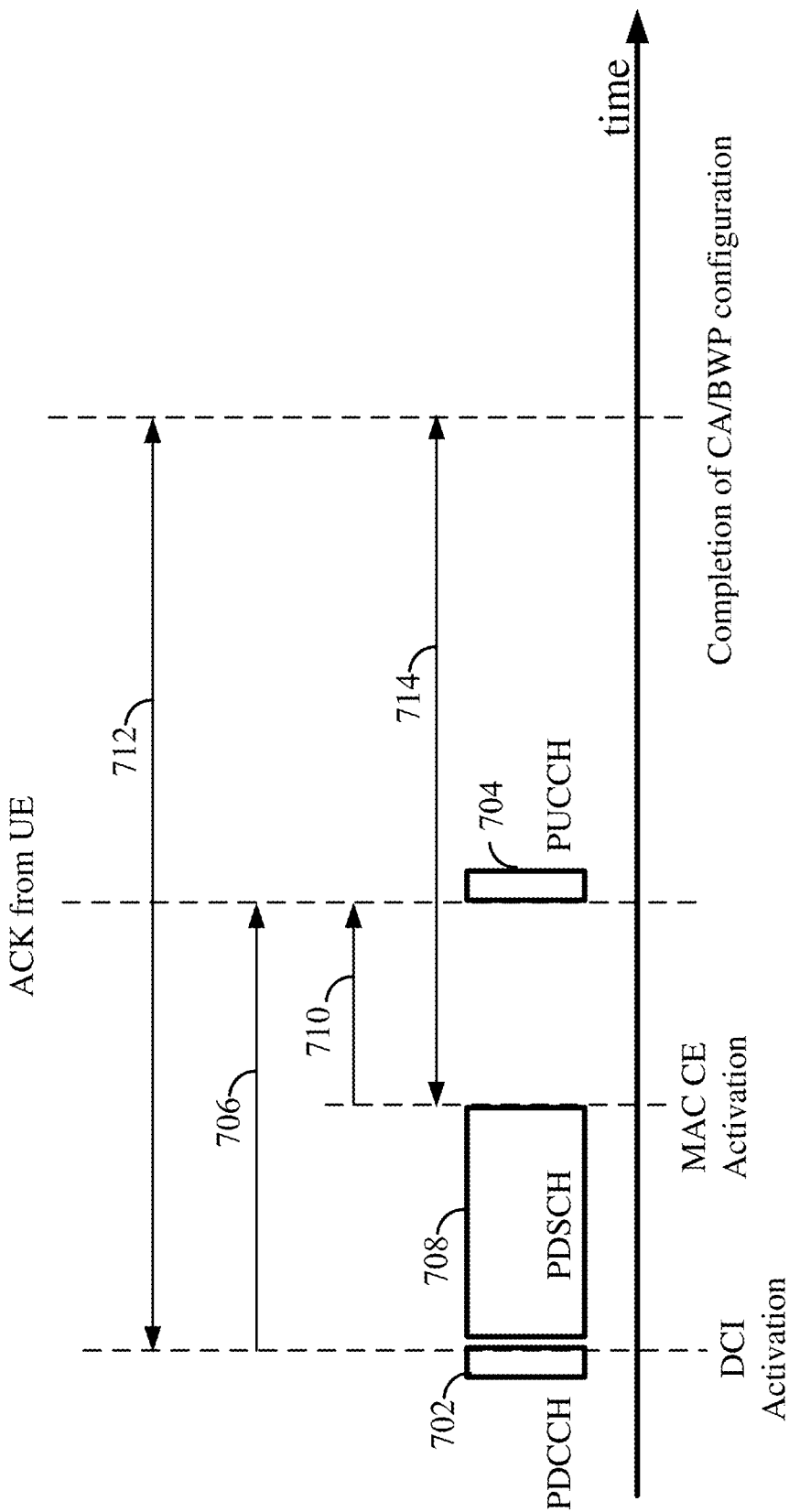
FIG. 7 is a diagram illustrating exemplary carrier aggregation (CA) and bandwidth part (BWP) configuration timing according to some aspects of the disclosure.

FIG. 7 is a diagram illustrating exemplary CA and BWP configuration timing according to some aspects of the disclosure. In one aspect of the disclosure, the BS 604 may transmit a CA configuration command or BWP configuration command using DCI carried in a PDCCH 702. In response to the CA/BWP configuration command (e.g., connection reconfiguration message 612), the UE 602 may transmit an acknowledgment message (e.g., CA/BWP ACK 614 in FIG. 6), for example, in a PUCCH 704. The ACK response timing 706 between the DCI activation of CA/BWP configuration command and ACK transmission may depend on UE capability or category. In some examples, the base station 604 may determine the ACK timing based on the reported UE capability category. That is, different UEs may have different ACK response timing 706. For example, a UE with better processing power and/or communication capability may be able to transmit the ACK in a PUCCH 704 faster than another UE with inferior processing power and/or communication capability.

In one aspect of the disclosure, the BS 604 may transmit a CA configuration command or BWP configuration command using a MAC control element (CE) that may be carried in a PDSCH 708. In response to the CA/BWP configuration command (e.g., connection reconfiguration message 612), the UE 602 may transmit an acknowledgment message (e.g., CA/BWP ACK 614 in FIG. 6), for example, in a PUCCH 704. The ACK timing 710 between the MAC CE activation and ACK transmission may depend on UE capability or category. That is, different UEs may have different ACK response timing 710 in response to a CA/BWP configuration command carried in a MAC CE. After transmitting the ACK, the UE needs certain time to reconfigure its software and/or hardware to operate in the new CA/BWP configuration. For example, the UE may need to activate or deactivate CCs, and/or activate/deactivate/swap BWP(s). In some examples, the timeline 712 of the DCI-based CA/BWP configuration/ reconfiguration may be different (e.g., longer or shorter) from the timeline 714 of the MAC CE-based CA/BWP configuration/reconfiguration. At the end of the CA/BWP configuration timeline, configuration/reconfiguration should be completed. In some examples, the CA configuration command and BWP configuration command may have different ACK timings and/or configuration timelines.

In one aspect of the disclosure, the UE 602 may report its ACK response timing to the base station 604 using, for example, radio resource control (RRC) signaling or other semi-static methods. For example, after receiving a CA/BWP configuration command, the UE 602 may send a message including CA/BWP ACK timing 618 (see FIG. 6; e.g., same slot, next slot, etc.) to the BS 604. In some examples, the UE 602 may include the CA/BWP ACK timing in the UE capability information 610. CA/BWP ACK timing indicates the time or slot in which the UE transmits the ACK to a CA/BWP configuration command.

A CA configuration command may activate one or more CCs. A CA configuration command may deactivate one or more CCs. A BWP configuration command may activate a BWP. A BWP configuration command may deactivate a BWP. A BWP configuration command may swap BWPs (i.e., causing the UE to switch from one BWP to another BWP in the same CC or different CCs).

In one aspect of the disclosure, CA/BWP ACK timeline may be predetermined based on UE capability or category. For example, the BS 604 may store information on the timelines for a plurality of UE capability categories. When the UE 602 reports its UE capability category, the BS 604 can select the corresponding predetermined timeline for a CA/BWP configuration command destined to that UE. By determining and selecting the CA/BWP ACK timeline, the BS 604 may schedule UL resources for the UE to transmit the CA or BWP ACK based on the predetermined timeline. For example, the UE 602 may be scheduled to transmit the ACK in the same slot in which the UE received the CA/DWP configuration command or in a different slot.

In another aspect of the disclosure, the BS 604 may configure the CA/BWP configuration/reconfiguration timeline (e.g., timelines 712 and 714) using RRC signaling. The CA/BWP timeline refers to a time period between the activation of the CA/BWP command and the completion of reconfiguration (e.g., activation/deactivation) of the corresponding CA/BWP. For example, the BS 604 may transmit an RRC message (e.g., connection reconfiguration 612) including CA/BWP configuration timeline information to the UE. In another aspect of the disclosure, the BS 604 may transmit the CA/BWP configuration timeline using DCI. For example, the BS 604 may include explicit CA/BWP timeline information in the DCI. In some examples, the CA/BWP configuration timeline may be implied via ACK/NACK timing in the DCI. In that case, CA/BWP should be completed within a predetermined period after ACK/NACK. In one example, the CA/BWP configuration timeline includes the processing time of CA/BWP configuration command (i.e., after which ACK can be sent), RF retuning delay, total radiated sensitivity (TRS) loop tracking, and channel state information (CSI) report, etc. Therefore, the ACK/NACK timing included in the DCI allows the UE to decide its end-to-end CA/BWP configuration timeline.

Figure 8:
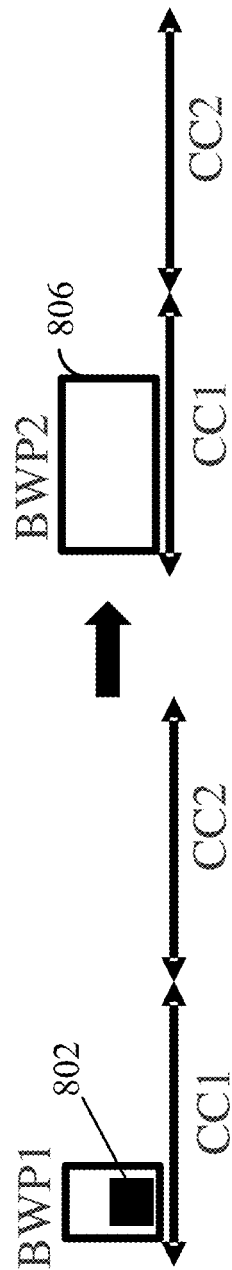
FIG. 8 is a diagram illustrating a BWP adaptation example according to some aspects of the disclosure.

FIG. 8 is a diagram illustrating a bandwidth part (BWP) adaptation example according to some aspects of the disclosure. Initially, the UE 602 may communicate with the BS 604 using a first BWP (denoted as BWP1 in FIG. 8) on a first component carrier (denoted as CC1 in FIG. 8). The BS 604 may send a BWP configuration command 802 (e.g., BWP adaptation or switching command) to the UE to switch from the first BWP to a second BWP (denoted as BWP2 in FIG. 8). In one aspect of the disclosure, the BS 604 may send the BWP configuration command 802 using resources of the BWP/CC that undergoes BWP adaptation. In this example, the BS 604 transmits the BWP configuration command 802 using resources in BWP1 of CC1. As a result, the UE 602 switches to use BWP2 of CC1 to communicate with the BS 604. In one example, BWP1 may be a narrowband BWP, and BWP2 may be a wideband BWP having a bandwidth wider than BWP1. In another example, BWP2 may be a narrowband BWP, and BWP1 may be a wideband BWP having a bandwidth wider than BWP2. In yet another example, BWP1 and BWP2 may have the same bandwidth but use different frequency bands.

Figure 9:
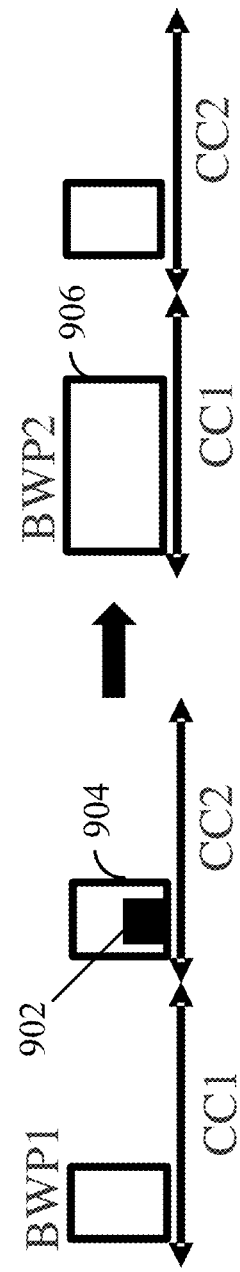
FIG. 9 is a diagram illustrating a second BWP adaptation example according to some aspects of the disclosure.

FIG. 9 is a diagram illustrating a second BWP adaptation example according to some aspects of the disclosure. Initially, the UE 602 may communicate with the BS 604 using a first BWP (denoted as BWP1 in FIG. 9) on a first CC (denoted as CC1 in FIG. 8). The BS 604 may send a BWP configuration command 902 (e.g., BWP adaptation or switching command) to the UE to switch from the BWP1 to a second BWP (denoted as BWP2 in FIG. 9). In one aspect of the disclosure, the BS 604 may send the BWP configuration command 902 using resources on a CC2 that is different from CC1 that undergoes BWP adaptation. This example may be referred to as cross-carrier BWP switching. The BS 604 may transmit the BWP configuration command 902 using resources in a BWP 904 of CC2. As a result, the UE 602 switches to use a BWP2 906 of CC1 to communicate with the BS 604. In one example, BWP1 may be a narrowband BWP, and BWP2 may be a wideband BWP having a bandwidth wider than BWP1. In another example, BWP2 may be a narrowband BWP, and BWP1 may be a wideband BWP having a bandwidth wider than BWP2. In yet another example, BWP1 and BWP2 may have the same bandwidth but use different frequency bands.

Figure 10:
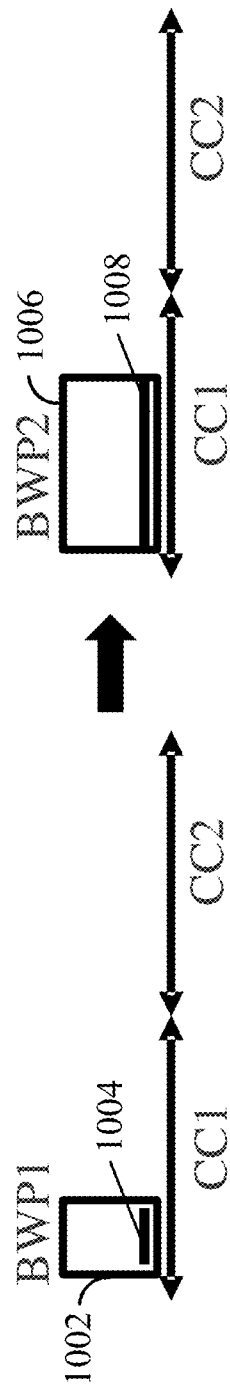
FIG. 10 is a diagram illustrating a third BWP adaptation example according to some aspects of the disclosure.

FIG. 10 is a diagram illustrating a third BWP adaptation example according to some aspects of the disclosure. Initially, the UE 602 may communicate with the BS 604 using a first BWP 1002 (denoted as BWP1 in FIG. 10) on a first CC (denoted as CC1 in FIG. 10). Then, the BS 604 may transmit a BWP configuration command 1004 to switch from BWP1 1002 to BWP2 1006. When BWP adaptation is performed on the same CC, the amount of resources (e.g., uplink or UCI resources on a PUCCH) available for transmitting the corresponding BWP ACK may be different after BWP switching. In this example, BWP1 and BWP2 are on the same carrier CC1, but BWP2 provides a wider bandwidth. Therefore, the UE 602 may be allocated with more resources for transmitting BWP ACK. In another example, BWP2 may provide a narrower bandwidth. Therefore, the UE 602 may have less resources for transmitting BWP ACK after switching.

In one aspect of the disclosure, the UE 602 may transmit the ACK for the BWP configuration command after BWP switching. In this case, the UE may use the UCI resources 1008 of BWP2 1006 to transmit the ACK. The BS 604 may configure the UCI resources for the ACK based on the available resources of BWP2 804, in addition to resources for any operations (e.g., ACK for CA activation) based on BWP1 802. A certain interruption or delay may occur before transmitting the ACK to allow the UE to reconfigure (e.g., retune RF circuitry) to use the new BWP.

In another aspect of the disclosure, the UE 602 may transmit the ACK for the BWP configuration command before BWP switching. In this case, the UE may use the UCI resources of BWP1 1002 to transmit the ACK. A certain interruption or delay may occur after transmitting the ACK to allow the UE to reconfigure (e.g., retune RF circuitry) to use the new BWP2. In some aspects of the disclosure, the BS 604 may schedule UCI resources for the BWP ACK using RRC or DCI signaling.

Figure 11:
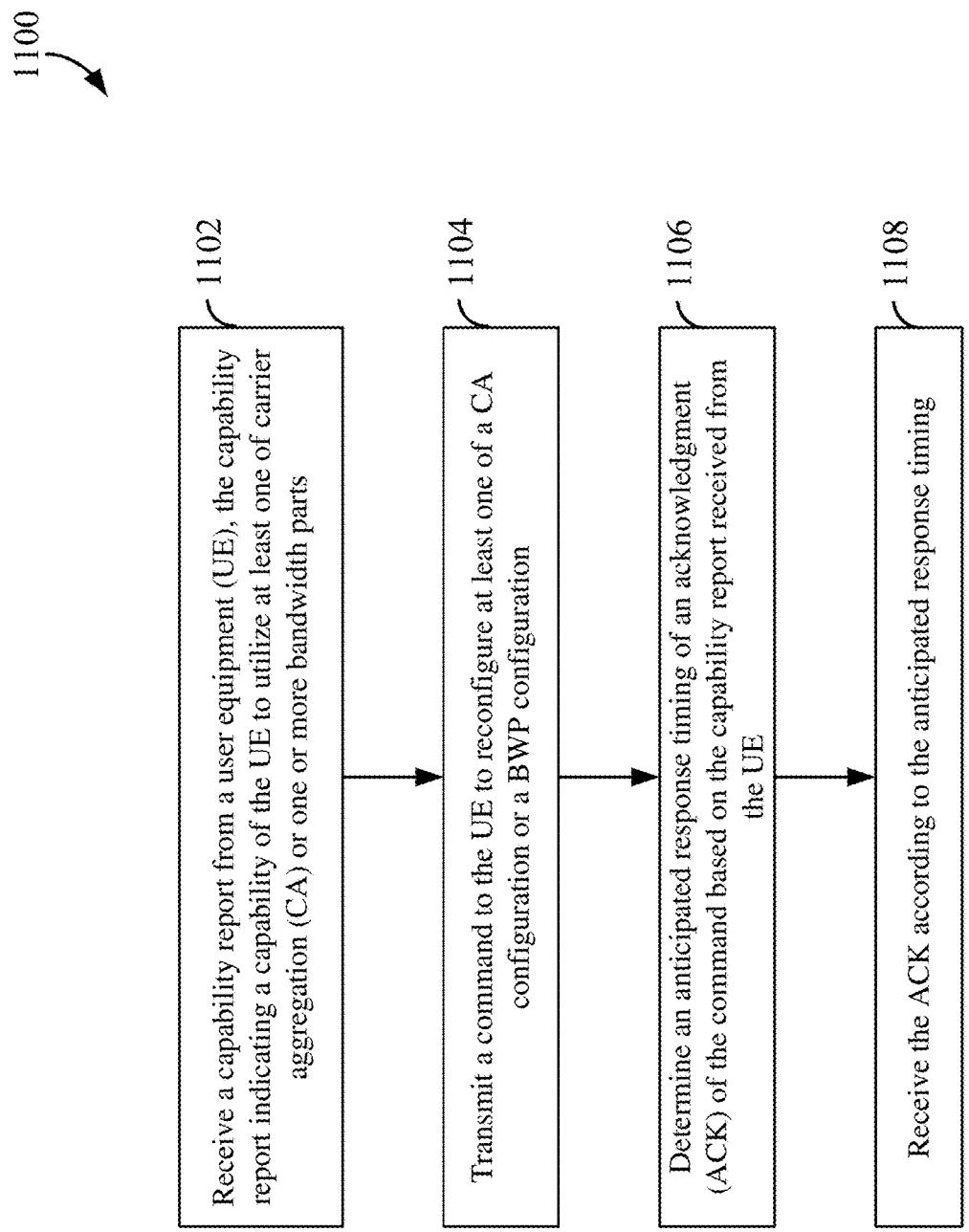
FIG. 11 is a flow chart illustrating an exemplary process for configuring CA or BWP according to some aspects of the present disclosure.

FIG. 11 is a flow chart illustrating an exemplary process 1100 for configuring CA or BWP in accordance with some aspects of the present disclosure. As described below, some or all illustrated features may be omitted in a particular implementation within the scope of the present disclosure, and some illustrated features may not be required for the implementation of all embodiments. In some examples, the process 1100 may be carried out by the scheduling entity 400 illustrated in FIG. 4. In some examples, the process 1100 may be carried out by any suitable apparatus or means for carrying out the functions or algorithm described below.

At block 1102, a scheduling entity (e.g., a base station) receives a capability report from a UE. The capability report indicates a capability of the UE to utilize at least one of carrier aggregation (CA) or one or more bandwidth parts. For example, the scheduling entity may use a communication circuit 442 (see FIG. 4) and a transceiver 410 to receive the capability report. In one example, the UE may be any UE (e.g., UE 602) illustrated in any of FIGS. 1, 2, and 6. In some examples, the capability report may indicate a UE category of the UE.

At block 1104, the scheduling entity may transmit a command to the UE to reconfigure at least one of a CA configuration or a bandwidth part (BWP) configuration. For example, the scheduling entity may use the communication circuit 442 and transceiver 410 to transmit the command. The command may be a CA configuration command or BWP configuration command. In one example, the scheduling entity may transmit the command using DCI. In another example, the scheduling entity may transmit the command using MAC CE. The CA configuration command may cause the UE to activate/deactivate one or more CCs. The BWP configuration command may cause the UE to activate/deactivate BWP.

At block 1106, the scheduling entity may determine an anticipated response timing of an acknowledgment (ACK) of the command (e.g., CA configuration command or BWP configuration) based on the capability report received from the UE. The anticipated response timing may be a time delay after which the UE sends an ACK of the command. For example, the scheduling entity may use the processing circuit 440 to analyze the capability report, which may indicate that the UE is capable of transmitting the ACK after a predetermined time delay in response to the command. The UE may indicate that it is capable of sending the ACK in the same slot where the command is received or a different slot. In some examples, the scheduling entity may determine the ACK timing based on the UE's category. That is, the scheduling entity may have predetermined timing information (e.g., default CA/BWP ACK timing) for various UE categories.

At block 1108, the scheduling entity may receive the ACK according to the anticipated response timing. For example, the scheduling entity may use the processing circuit 440 to schedule or allocate resources (e.g., PRBs) for receiving the ACK based on the response timing, and use the communication circuit 442 and transceiver 410 to receive the ACK using the scheduled resources.

Figure 12:
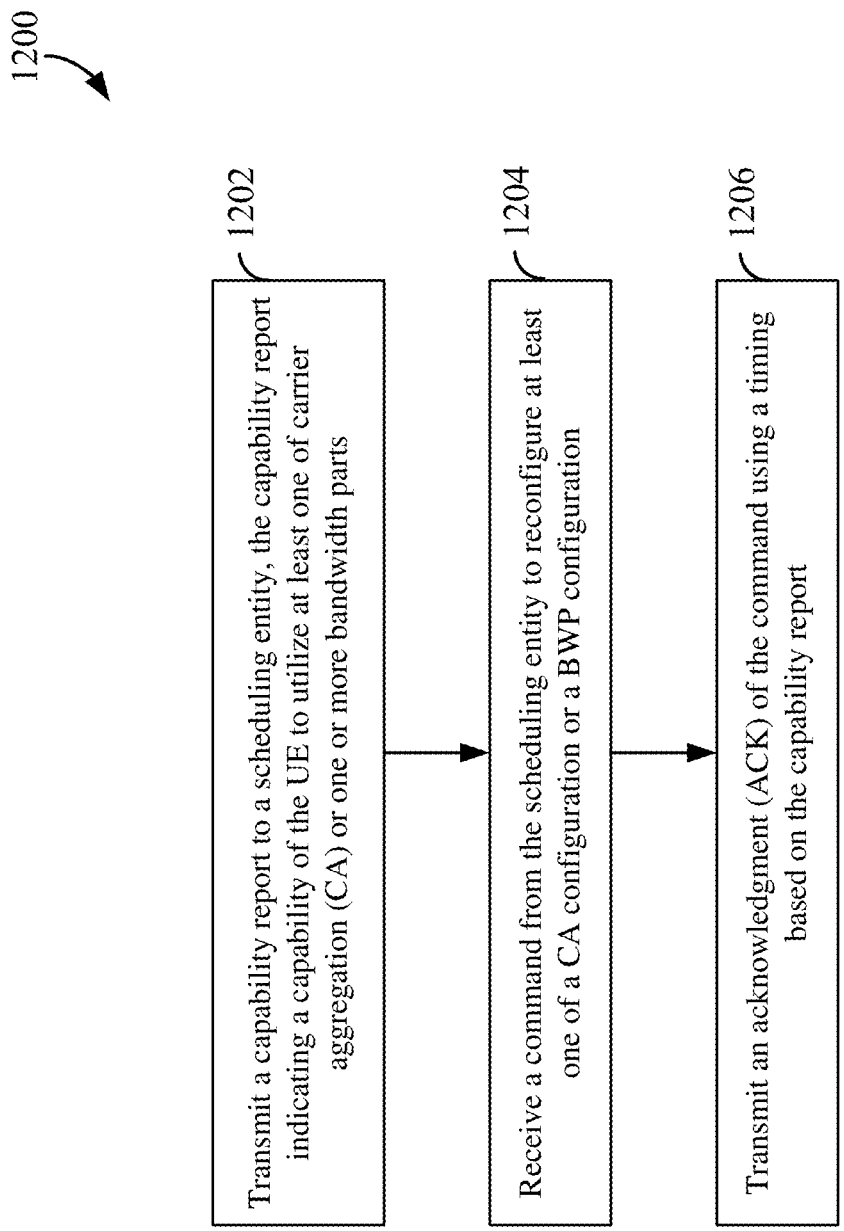
FIG. 12 is a flow chart illustrating another exemplary process for configuring CA or BWP according to some aspects of the present disclosure.

FIG. 12 is a flow chart illustrating an exemplary process 1200 for configuring CA or BWP in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 500 illustrated in FIG. 5. In some examples, the process 1200 may be carried out by any suitable apparatus or means for carrying out the functions or algorithm described below.

At block 1202, a scheduled entity (e.g., UE 602) transmits a capability report to a scheduling entity (e.g., base station 604). The capability report indicates a capability of the UE to utilize at least one of carrier aggregation (CA) or one or bandwidth parts for wireless communication. The capability report may indicate the UE category of the scheduled entity. For example, the scheduled entity may use a communication circuit 542 (see FIG. 5) and a transceiver 510 to transmit the capability report. In one example, the scheduled entity may be a UE (e.g., UE 602) illustrated in any of FIGS. 1, 2, and 6.

At block 1204, the scheduled entity may receive a command from the scheduling entity to reconfigure at least one of a CA configuration or a BWP configuration. For example, the scheduled entity may use the communication circuit 542 and transceiver 510 to receive the command. The command may be a CA configuration command or BWP configuration command. In one example, the scheduled entity may receive the command in DCI. In another example, the scheduled entity may receive the command in MAC CE.

At block 1206, the scheduled entity may transmit an ACK of the command using a timing based on the capability report or UE category. For example, the scheduled entity may use the communication circuit 542 and transceiver 510 to transmit the ACK. The capability report may indicate that the scheduled entity is capable of transmitting an ACK after a predetermined time delay or in a certain slot after receiving the command. For example, the scheduled entity may indicate that it is capable of sending the ACK in the same slot where the command is received or a different slot after the slot for receiving the command.

In one configuration, the apparatus 400 for wireless communication includes means for receiving a capability report from a UE, the capability report indicating a capability of the UE to utilize at least one of CA or one or more bandwidth parts. The apparatus 400 further includes means for transmitting a command to the UE to reconfigure at least one of a CA configuration or a BWP configuration. The apparatus 400 further includes means for determining a response timing of an ACK of the command based on the capability report received from the UE. The apparatus 400 further includes means for receiving the ACK according to the determined response timing. In one aspect, the aforementioned means may be the processor 440 and communication circuit 442 in which the invention resides shown in FIG. 4 configured to perform the functions recited by the aforementioned means. In another aspect, the aforementioned means may be a circuit or any apparatus configured to perform the functions recited by the aforementioned means.

In one configuration, the apparatus 500 for wireless communication includes means for transmitting a capability report to a scheduling entity (e.g., base station), the capability report indicating a capability of the apparatus 500 (e.g., UE) to utilize at least one of CA or one or more bandwidth parts. The apparatus 500 further includes means for receiving a command from the scheduling entity to reconfigure at least one of a CA configuration or a BWP configuration. The apparatus 500 further includes means for transmitting an ACK of the command according to the capability or category of the UE.

Of course, in the above examples, the circuitry included in the processor 404/504 is merely provided as an example, and other means for carrying out the described functions may be included within various aspects of the present disclosure, including but not limited to the instructions stored in the computer-readable storage medium 406/506, or any other suitable apparatus or means described in any one of the FIGS. 1, 2, and/or 6, and utilizing, for example, the processes and/or algorithms described herein in relation to FIGS. 6-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
    transmitting a capability report requested by a scheduling entity to the scheduling entity, the capability report indicating a capability of the UE to perform a bandwidth part (BWP) reconfiguration and a timing corresponding to the BWP reconfiguration;
    receiving a command from the scheduling entity, the command indicating the BWP reconfiguration; and
    completing the BWP reconfiguration according to the timing.

2. The method of claim 1, wherein the receiving the command comprises:
    receiving a BWP configuration command in downlink control information (DCI) of a downlink control channel;
    receiving a BWP configuration command in a medium access control (MAC) control element (CE); or
    receiving a BWP configuration command in a radio resource control (RRC) command.

3. The method of claim 2, wherein the completing the BWP reconfiguration comprises:
    reconfiguring a BWP configuration in a first timeline in response to receiving the BWP configuration command using the DCI; and
    reconfiguring the BWP configuration in a second timeline in response to receiving the BWP configuration command using the MAC CE, and the first timeline is different from the second timeline.

4. The method of claim 1, wherein the command is configured to activate, deactivate, or switch a BWP used by the UE.

5. The method of claim 1, wherein the receiving the command comprises:
    receiving a BWP configuration command using a first component carrier (CC), wherein the BWP configuration command configures the UE to switch from a first BWP of the first CC to a second BWP of the first CC.

6. The method of claim 1, wherein the receiving the command comprises:
    receiving a BWP configuration command using a first component carrier (CC), wherein the BWP configuration command configures the UE to switch from a first BWP of a second CC to a second BWP of the second CC.

7. A user equipment (UE) for wireless communication, comprising:
    a transceiver for wireless communication;
    a memory; and
    a processor coupled with the transceiver and the memory, the processor and the memory being configured to:
        transmit a capability report to a scheduling entity, the capability report indicating a capability of the UE to perform a bandwidth part (BWP) reconfiguration and a timing corresponding to the BWP reconfiguration;
        receive a command from the scheduling entity, the command indicating the BWP reconfiguration; and
        complete the BWP reconfiguration according to timing.

8. The UE of claim 7, wherein, to receive the command from the scheduling entity, the processor and the memory are further configured to:

receive a BWP configuration command in downlink control information (DCI) of a downlink control channel;
receive a BWP configuration command in a medium access control (MAC) control element (CE); or
receiving a BWP configuration command in a radio resource control (RRC) command.

9. The UE of claim 8, wherein, to complete the BWP reconfiguration, the processor and the memory are further configured to:
reconfigure a BWP configuration in a first timeline in response to receiving the BWP configuration command using the DCI; and
reconfigure the BWP configuration in a second timeline in response to receiving the BWP configuration command using the MAC CE, and the first timeline is different from the second timeline.

10. The UE of claim 7, wherein the command is configured to activate, deactivate, or switch a BWP used by the UE.

11. The UE of claim 7, wherein, to receive the command, the processor and the memory are further configured to:
receive a BWP configuration command using a first component carrier (CC), wherein the BWP configuration command configures the UE to switch from a first BWP of the first CC to a second BWP of the first CC.

12. The UE of claim 7, wherein, to receive the command, the processor and the memory are further configured to:
receive a BWP configuration command using a first component carrier (CC), wherein the BWP configuration command configures the UE to switch from a first BWP of a second CC to a second BWP of the second CC.

13. A method of wireless communication at a scheduling entity, comprising:
receiving a capability report requested by the scheduling entity from a user equipment (UE), the capability report indicating a capability of the UE to perform a bandwidth part (BWP) reconfiguration and a timing corresponding to the BWP reconfiguration; and
transmitting a command to the UE, the command indicating the BWP reconfiguration.

14. The method of claim 13, wherein the transmitting the command comprises:
transmitting a BWP configuration command in downlink control information (DCI) of a downlink control channel;
transmitting a BWP configuration command in a medium access control (MAC) control element (CE); or
transmitting a BWP configuration command in a radio resource control (RRC) command.

15. The method of claim 14, further comprising:
receiving a reconfiguring complete message in a first timeline corresponding to the BWP configuration command transmitted using the DCI; and
receiving the reconfiguration complete message in a second timeline corresponding to the BWP configuration command transmitted using the MAC CE, and the first timeline is different from the second timeline.

16. The method of claim 13, wherein the command is configured to activate, deactivate, or switch a BWP used by the UE.

17. The method of claim 13, wherein the transmitting the command comprises:
transmitting a BWP configuration command using a first component carrier (CC), wherein the BWP configuration command configures the UE to switch from a first BWP of the first CC to a second BWP of the first CC.

18. The method of claim 13, wherein the transmitting the command comprises:
transmitting a BWP configuration command using a first component carrier (CC), wherein the BWP configuration command configures the UE to switch from a first BWP of a second CC to a second BWP of the second CC.

19. A scheduling entity for wireless communication, comprising:
a transceiver for wireless communication;
a memory; and
a processor coupled with the transceiver and the memory, the processor and the memory being configured to:
receive a capability report from a user equipment (UE), the capability report indicating a capability of the UE to perform a bandwidth part (BWP) reconfiguration and a timing corresponding to the BWP reconfiguration; and
transmit a command to the UE, the command indicating the BWP reconfiguration to be completed according to the timing.

20. The scheduling entity of claim 19, wherein, to transmit the command to the UE, the processor and the memory are further configured to:
transmit a BWP configuration command in downlink control information (DCI) of a downlink control channel;
transmit a BWP configuration command in a medium access control (MAC) control element (CE); or
transmit a BWP configuration command in a radio resource control (RRC) command.

21. The scheduling entity of claim 20, wherein the processor and the memory are further configured to:
receive a reconfiguration complete message in a first timeline corresponding to the BWP configuration command transmitted using the DCI; and
receive the reconfiguration complete message in a second timeline corresponding to the BWP configuration command transmitting using the MAC CE, and the first timeline is different from the second timeline.

22. The scheduling entity of claim 19, wherein the command is configured to activate, deactivate, or switch a BWP used by the UE.

23. The scheduling entity of claim 19, wherein, to transmit the command, the processor and the memory are further configured to:
transmit a BWP configuration command using a first component carrier (CC), wherein the BWP configuration command configures the UE to switch from a first BWP of the first CC to a second BWP of the first CC.

24. The scheduling entity of claim 19, wherein, to transmit the command, the processor and the memory are further configured to:
transmit a BWP configuration command using a first component carrier (CC), wherein the BWP configuration command configures the UE to switch from a first BWP of a second CC to a second BWP of the second CC.

* * * * *